July 29, 1952     A. N. IKNAYAN     2,605,200
METHOD OF MAKING SAFETY TYPE INNER TUBE
Filed July 7, 1950     2 SHEETS—SHEET 1
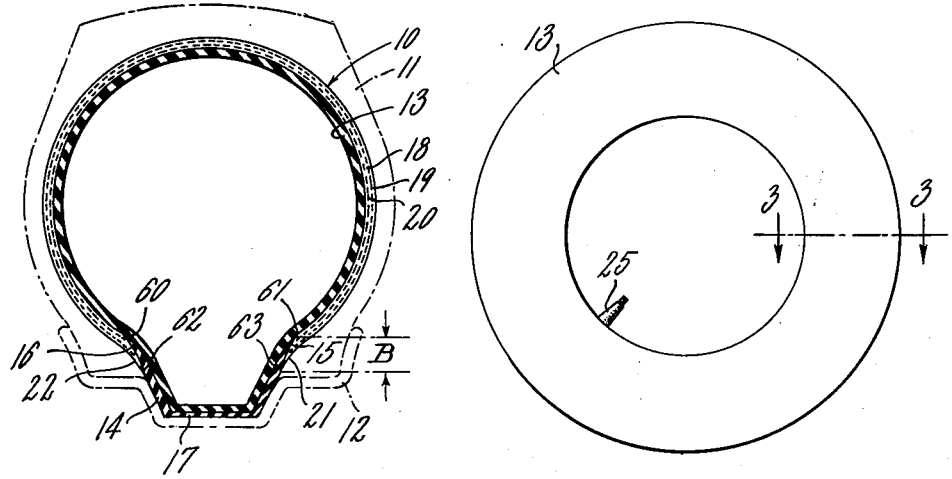
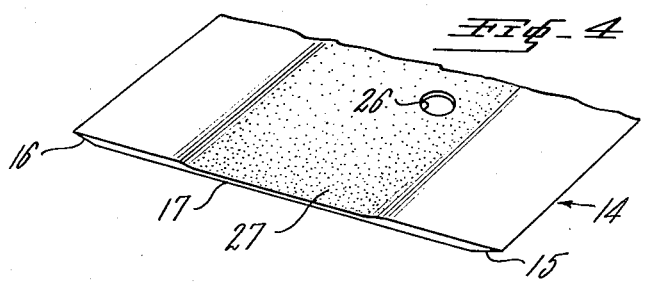
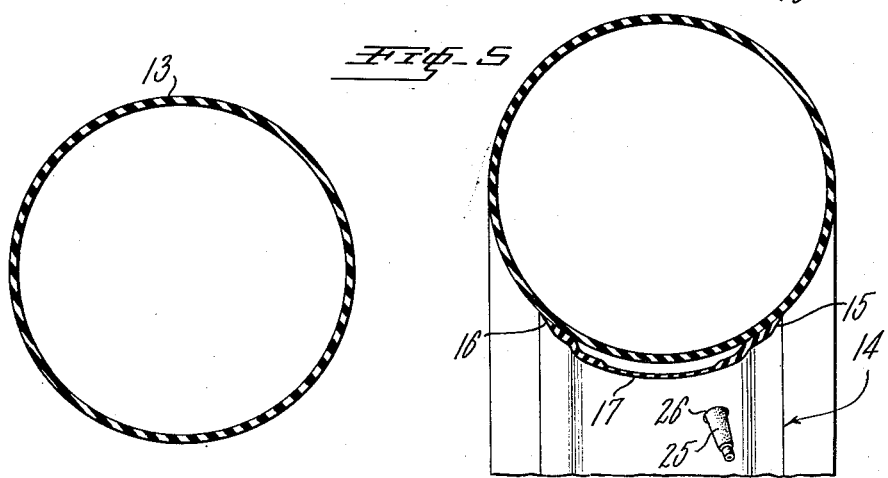
INVENTOR.
ALFRED N. IKNAYAN
BY
James J. Long
AGENT

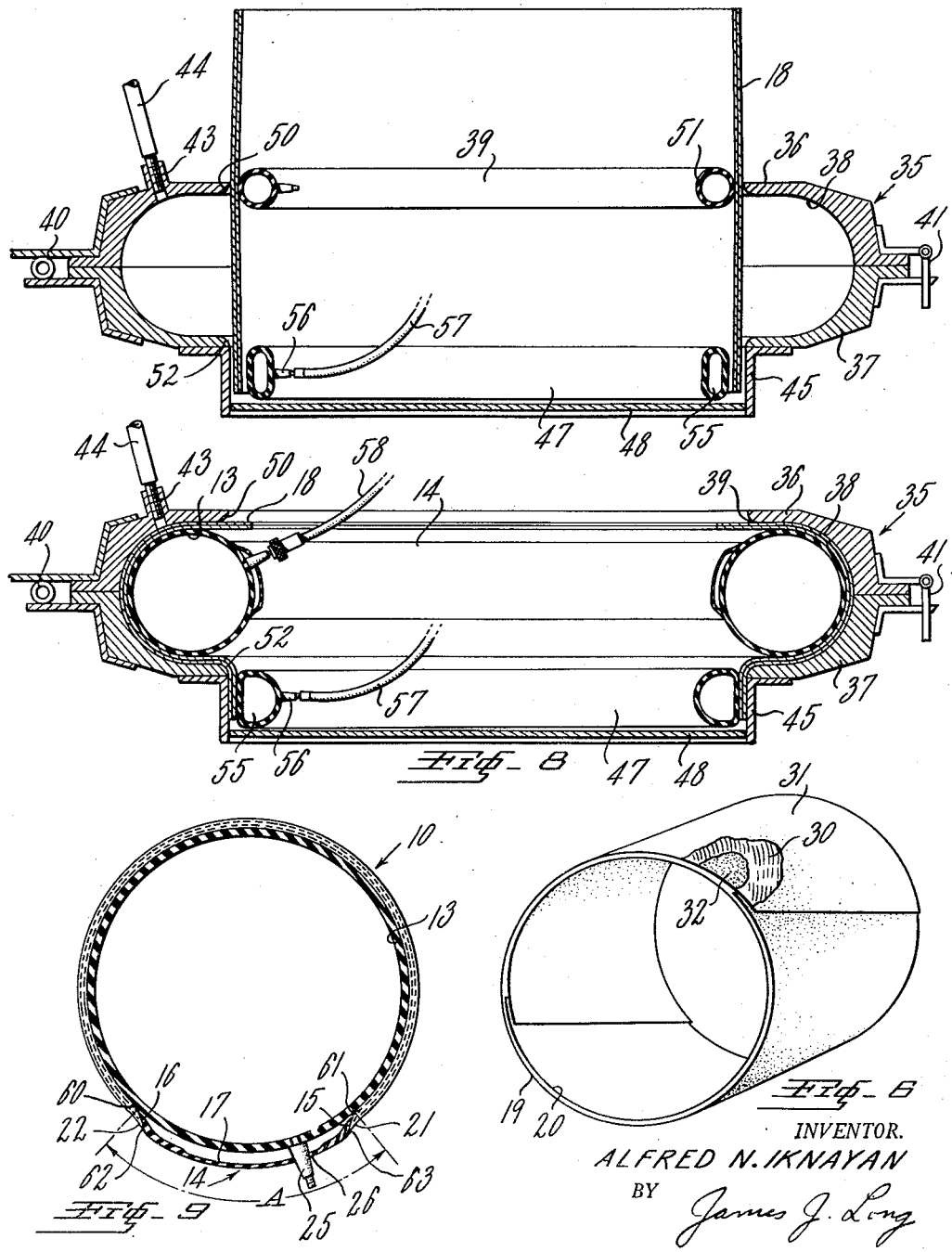

Patented July 29, 1952

2,605,200

UNITED STATES PATENT OFFICE 2,605,200

METHOD OF MAKING SAFETY TYPE INNER TUBE

Alfred N. Iknayan, Indianapolis, Ind., assignor to United States Rubber Company, New York, N. Y., a corporation of New Jersey Application July 7, 1950, Serial No. 172,473

6 Claims. (Cl. 154—14)

This invention relates to a method of making inner tubes and, more particularly, it relates to a method of making a safety type of inner tube in which the inner tube includes stranded reinforcing elements for the purpose of increasing the strength and rigidity of the tube wall, thereby supplementing the strength of the tire carcass with which the inner tube is associated.

The improved inner tube disclosed herein is claimed in my copending application Serial No. 154,177 filed April 5, 1950 and assigned to the same assignee as the instant application.

In the operation of automotive vehicles, the hazard of blowouts and quick deflations of pneumatic tires is becoming increasingly dangerous. Due to the high speed at which automotive vehicles are driven and due to the increased horsepower of the engines for driving the vehicles, the performance expected of tires is constantly increasing. It is difficult to provide a pneumatic tire which is blowout-proof. Furthermore, tires frequently receive serious injury in their operation due to one of many causes such as using improper inflation pressures or riding over objects which produce undue distortions to the carcass. Such injuries or weak spots in the carcass are not readily apparent even upon careful inspection.

In accordance with the practice of my invention, I provide a method of making an inner tube having strain resisting elements and which is capable of fortifying a pneumatic tire so as to constitute an added reinforcement as an insurance against failure.

It is recognized that various types of safety tubes have been tried out, and that even the most successful of the tubes heretofore used commercially do not provide a desired insurance against sudden deflation. It is also recognized that greater strength may be imparted to a tire carcass by providing a carcass having a greater number of plies. Such additional plies, however, are not particularly satisfactory because any rupture or break in the carcass tends to move progressively throughout the thickness of the carcass regardless of the number of plies. Consequently, an increase in carcass thickness is not the whole answer to increased protection. I have found, however, that such increased protection to the carcass may be obtained by utilizing increased plies which are separate and not united as a unit to the carcass. As a result of the use of such a separate unit, a break in the carcass may progress through the entire carcass, but will not readily proceed through a separate unit which to some extent is self-adjusting within the carcass and assumes its own strain-resisting characteristics.

I provide an inner tube, the principal walls of which include strain-resisting elements and which in combination includes an extensible portion which permits the inner tube to expand and fill out the entire chamber as defined by the interior of the tire casing and the rim with which it is associated. I have also found that the junction between the extensible portion of the inner tube and the inextensible portion must lie within a critical region relative to the tire assembly in order that the benefits of the improved tire may be obtained. Still further, I have found that the junction between the extensible and inextensible portions should be located along the wall of the inextensible portion to allow relatively free ends of the inextensible portion to serve as relief for the strain-resisting elements within the inextensible portion.

It is recognized that heretofore certain inner liners have been used between the tire carcass and the conventional inner tube. The tube made by the method of the present invention differs from such a construction in that it is objectionable to place a free or floating liner between the inner tube and the casing because of its tendency to creep as the tire is rotated and because it includes terminating edges which usually lie in the flexing zone of the tire, thereby causing differential movements which result in chafing and eventual failure of the inner tube.

Another object of my invention is to provide a method of making an inner tube which even in a severe break in the carcass of the pneumatic tire will tend to bridge the break and prevent a blowout. Under such conditions a tire is substantially damaged and a definite thumping noise will be apparent to the operator so that the vehicle may be stopped and the tire inspected. Under these conditions the tire remains fully inflated and may be driven substantial distances before chafing will become so extensive as to cause failure of the inner tube. After such eventuality, it has been found that the tube will still deflate slowly thus overcoming the danger of sudden deflation.

Still another object of my invention is the provision of a method of assembling the various parts of an inner tube of the character indicated in properly disposed operable relation without formation of folds, wrinkles, or other functional distortions.

A further object is to make a strong inner tube having exceptional resistance to air leakage by an economical and convenient method.

These and other objects and advantages will appear more fully in the following detailed description when considered in connection with the accompanying drawings, in which:

Fig. 1 is a transverse view, in section, of an inner tube assembly, made according to the invention, in an inflated condition and shown in relative position with a tire casing and wheel rim;

Fig. 2 is an elevational view of the liner member of the inner tube assembly;

Fig. 3 is a transverse view, in section, of the liner member on a larger scale taken along lines 3—3 of Fig. 2;

Fig. 4 is a fragmentary perspective view of an extensible strip for association with the rim portion of the assembly;

Fig. 5 is a fragmentary perspective view, in section, of the liner member with the rim strip applied thereto;

Fig. 6 is a perspective view of strain-resisting members as assembled in band form for application to the liner member, with parts broken away;

Fig. 7 is a transverse sectional view of a vacuum former, showing the strain-resisting band in place therein;

Fig. 8 is a similar view of the vacuum former, showing the strain resisting band drawn to toroidal shape and having the liner member inserted therein; and Fig. 9 is a transverse sectional view of the completed tube assembly.

With reference to the drawings, and in particular to Fig. 1, the improved inner tube 10 is shown in place in the inflated condition within a conventional tire casing 11, mounted on a wheel rim 12. Essentially, the inner tube 10 comprises an inner liner or air retaining envelope 13 having a rim strip 14 of extensible material attached to the assembly along its outer marginal surfaces 15 and 16, and free from attachment over its medial zone 17, as shown most clearly in Fig. 9. To provide strength, the crown and sidewall portions of the liner tube 13 are enclosed by, and integrally united to, an encircling band 18 comprising a plurality of reinforcing plies, preferably two plies 19 and 20 of rubberized tire fabric. The ends 21 and 22 (Figs. 1 and 9) of the reinforcing band 18 are left relatively free of direct attachment to the liner tube 13, but instead are joined to the outer marginal surfaces 15 and 16 of the extensible rim strip 14. The purpose of the rim strip 14 is to maintain the relatively free ends 21 and 22 of the reinforcing band 18 in position and to prevent them from becoming folded or otherwise improperly disposed when the tube is mounted on a wheel. As is disclosed in more detail in my copending application Serial No. 794,867, filed December 31, 1947, now Patent No. 2,550,193, dated April 24, 1951, and assigned to the same assignee as the present invention, such a connecting rim strip is highly advantageous in association with any form of inner tube including protective rim flaps, positioned similarly to the flaps or ends 21 and 22 of the present tube construction.

The invention contemplates manufacture of a reinforced inner tube of the foregoing character by providing a liner tube or air retaining envelope 13 in annular toroidal form, that is, in essentially the form of an ordinary inner tube, as shown in Figs. 2 and 3. The liner tube 13 may be made in the same manner as conventional inner tubes are made, that is, the material from which the tube is made may be extruded in tubular form in continuous lengths, then cut into suitable lengths, the ends of which are spliced together to form an annular torus, after which the resulting tubes may be subjected to the usual shaping and curing operations in an inner tube mold to form the completed liner tube 13. The usual valve stem 25 for filling the tube with air may be associated with the tube prior to the splicing operation.

The crown and sidewall surfaces of the liner tube 13 are buffed to promote adhesion of the subsequently applied reinforcing band 18.

The buffing operation is preferably performed while the tube is inflated. The rim area of the liner tube is not buffed, in order that the subsequently applied rim strip will not become permanently bonded thereto. The surface of the tube is then coated with rubber cement.

The liner tube 13 is composed of flexible material having high resistance to air leakage, such as butyl rubber, that is, a rubbery copoylmer of a major proportion of a monoolefin, e. g. isobutylene, with a minor proportion of a conjugated 1,3-diene, e. g. isoprene. The liner 13 provides the desired resistance to air leakage.

The rim strip 14 is made of elastic extensible material such as natural rubber or butyl rubber. The strip 14 may be extruded in continuous lengths and thereafter cut to size. The marginal surfaces 15 and 16 of the strip are tapered. A hole 26 is punched in the length of rim strip to accommodate freely the valve stem 25. The medial zone 17 of the rim strip, which is made relatively thin so that it will be readily extensible, is covered with a coating 27 of adhesion preventing material, such as mica in order that the rim strip will remain free from attachment to the liner tube over its medial zone 17. The ends of the rim strip 14 may then be spliced together and the resulting band is applied along the rim area of the inflated liner tube 13. The marginal areas of the uncured rim strip 14 are pressed into firm smooth engagement with the liner tube and are thereby temporarily adhered thereto, thus completing this part of the assembly as shown in Fig. 5. The attachment of the marginal areas of the rim strip to the liner tube is not a permanent bond, because the contacting areas of the tube were not buffed.

The inextensible reinforcing band 18 constituting the strain resisting portion of the inner tube assembly may then be prepared. The plies 19 and 20 constituting the strain resisting band 18 are composed of rubberized stranded reinforcing material, preferably nylon, or other reinforcing material such as cotton cords, rayon yarns or steel wires or cable may be used. As indicated in Fig. 6, each ply is composed of a fabric reinforcing material consisting of parallel yarns or cords 30, skim coated on each side with layers of rubber 31 and 32. In order that the wall of the tube may be relatively thin, while still having adequate strength, the reinforcing material is preferably made of nylon, and the gauge of such nylon cord 30 before it is rubberized is preferably in the range of from 0.015 to 0.028. Nylon cord formed of plied yarns, in which the cord has a gauge of 0.020 and having a strength of approximately 25 pounds, such cords being spaced 35 ends per inch, is particularly suitable. This construction permits the desired thin wall thickness so that the tube does not become excessively hot in operation, as would be the case if the tube wall were thick. The direction of the cords 30 is generally diagonal in respect to a circumferentially extending center line. More specifically, the cords lay at an angle so that after the shaping operation hereinafter described the cords will constitute an angle of approximately 50°. The cords in adjacent plies are preferably arranged to run in opposite directions.

In accordance with customary procedure in tire manufacture, the textile reinforcing fabric cords 30 are treated with a resin-latex composition to promote adhesion of rubber thereto, and thereafter each side of the fabric is skim coated with a layer of vulcanizable rubber composition on a calendar. For example, a layer of rubber composition 31 of a gauge of 0.015 inch is applied to the underside of the fabric cords 30 and a layer of rubber composition 31 of a gauge of 0.045 inch is applied to the outer side of the fabric. The band 18 shown in Fig. 6 may be made by superimposing the two plies 19 and 20 on the surface of a drum or mandrel (not shown) which serves as a form. The band 18 is then removed from the form.

The strain resisting band 18 is associated with the liner tube with the aid of a vacuum shaping box 35 shown in Figs. 7 and 8. The box 35 is composed of upper and lower halves 36 and 37 having generally the form of an annular torus, defining an internal cavity 38 for accommodating the tube and having a center opening 39 in the top through which the tube may be inserted. The box halves 36 and 37 are provided with a hinge 40 on one side whereby the box may be opened up for removal of the shaped assembly from the cavity 38, and on the other side of the box there is provided a latch 41 for maintaining the box halves together when the box is closed. An inlet nipple 43 threaded into the top half 36 of the box is connected to a hose 44 leading to a source of vacuum controlled by suitable valves (not shown).

An annular bottom flange 45 extends downwardly from the bottom section of the box, defining a central space 47 corresponding to the upper central opening 39 of the box. A bottom plate 48 serves to close off the bottom of the central space 47 and supports the strain resisting band 18 in a vertical position when the band is inserted in the upper central opening 39 of the box as shown in Fig. 7 for the purpose of shaping the band. To permit production of a vacuum within the cavity 38, so that the band may be caused to conform to the shape of the cavity, the band is brought into sealing engagement with the upper edge 50 of the upper box half 36 by inserting into the interior of the band a small inflated conforming tube 51 of appropriate diameter and holding it against the interior surface of the band in opposition to the edge 50 as shown in Fig. 7. This is conveniently done by hand. At the same time the lower portion of the band is sealed against the lower edge 52 of the lower half 37 of the box and inner surface of the flange 45, by means of a pneumatically expansible conforming tube 55, which is supplied with compresesd air by means of a valve stem 56 and hose 57 connected to a compresed air source through suitable valves (not shown). As the tube 55 is inflated the lower edge of the band 18 is pressed into sealing engagement with the box as shown in Fig. 8. In Fig. 7, the tube 55 is shown in a deflated condition, in which state there is a space between the tube 55 and the sides of the box, permitting insertion of the band.

As vacuum is applied to the cavity 38 through the hose connection 44 the band 18 is drawn inwardly into conformance with the walls of the cavity 38, the lower section of the band being held rigidly in place by expansion of the lower conforming tube 55 as shown in Fig. 8, while the upper portion of the band, which slidably engages the hand-held upper conforming tube 51, is permitted to slide downwardly and inwardly past the upper box edge 50 into the cavity. The upper conforming tube 51 is then removed, the buffed and cemented liner tube assembly 13 is coated over its entire outer surface with a lubricating substance, such as zinc stearate, to facilitate the assembly operation, and the liner tube is then deflated and inserted through the opening 39 in the top of the vacuum box into the shaped strain resisting band 18. The liner tube is then inflated by means of an air hose 58 connected to its valve stem 25 as shown in Fig. 8, bringing its outer surface into contact with the inner surface of the shaped band 18. The conforming tube 55 is then deflated, the vacuum on the box is broken, and the box is opened, permitting removal of the assembly. The marginal surfaces of the rim strip 14 are moistened with gasoline to render them tacky and the free edges of the strain-resisting band 18 are pressed into smooth conformity with the liner tube assembly, as indicated in Fig. 9.

The assembly is placed in the inflated condition in an inner tube mold of suitable size and vulcanized therein under pressure. During the vulcanization the entire inner surface of the strain-resisting band 18 becomes firmly and integrally united to the outer crown and sidewall surfaces of the liner tube 13, as well as to the outer marginal surfaces 15 and 16 of the rim strip 14. The rim strip 14 is itself free from any direct attachment to the liner tube 13, since the bond formed when the edges of the uncured rim strip were pressed against the cured liner tube was only a temporary bond that did not persist through cure of the assembly.

The tube is preferably so proportioned that the junctions 60 and 61 (Figs. 1 and 9) of the strain-resisting band 18 to the liner tube are located in spaced relation from the relatively free terminal ends 21 and 22 of the band. The distance between these junctions as defined by the letter "A" in Fig. 9 is about 13% to 27%, and preferably 20%, of the circumferential distance crosssectionally around the inner tube. This distance represents a measurement taken on the inner tube when it is unmounted and inflated merely sufficiently to expand the tube to circular shape without any substantial distortion of the tube. These junctions, and also the junctions 62 and 63 of the rim guard strip 14 to the terminal ends 21 and 22 of the reinforcing band, should lie between the seat of the rim and the outer diameter of the flange of the rim when the tube is mounted on a wheel. This zone is indicated by a dimension "B" in Fig. 1. The reason for limiting the location of this junction is that it is essential that the strain-resisting portion of the inner tube as defined by the plies 19 and 20 should extend from bead to bead of the tire and lie within that zone in which no flexing of the tire occurs while in operation. The distance represented by the letter "B" is within this non-flexing zone.

The inner tube is intended to be of such dimensions that it will fit closely within the interior of the tire casing with which it is intended for assembly. In other words, the inner tube with slight inflation will completely fill the cavity of the tire casing without any substantial strain on the reinforcing plies 19 and 20 constituting the principal portion of the inner tube.

The advantages of such a composite tube have been well demonstrated and the two additional plies constituting the strain-resisting body of the tube supplements the carcass strength of the tire. When nylon is used as the strain-resisting element, this supplementary strength is still greater relative to the carcass. When steel cord is used in the inner tube, the strength of the tube becomes even greater than the strength of the tire carcass. Therefore, the protective value of the inner tube is evident in that it will retain the inflated condition of the tire notwithstanding failure of the tire itself.

Many tests have been made to determine the practicability and performance of the inner tube of this invention. For example, in one of these tests an inner tube was mounted on a 6.50-16 tire, the casing having a rupture extending through the tire carcass in the form of an X and the size of the rupture was 2½ inches by 2 inches. This tire was driven a distance of 96 miles before the operator became aware of a bumping of the tire. The vehicle was driven at the rate of 70 miles per hour on a paved road. At 117 miles the tire started to throw its tread and at this point the tube failed and the deflation of the tube was sufficiently slow to permit the vehicle to be easily handled until reaching a complete stop. An inspection of the tire showed that a fabric break extended 2 inches above the bead around the tread of the tire and to a point 2 inches above the opposite bead. Attempts have been made to repeat this test using conventional inner tubes when using a similar casing having a break size of 2½ inches by 2 inches. The tire ran only 34 miles before the tube failed completely and without warning causing the vehicle to swerve badly. An inspection of the tire showed the size of the rupture had increased to 3 inches by 2 inches.

In order to show the advantages of the present tube in connection with its puncture resisting characteristics, a tire having a tube of the foregoing character was punctured by forcing into the casing and through the tube a nail of a diameter of 0.134 inch. This tire was driven a distance of 330 miles at from 45 to 55 miles per hour without failure and without loss of air. Similar tests were conducted using nails having diameters of 0.148, 0.164, 0.209, 0.229, 0.248 and 0.265 inch. In each case the tires were driven a distance of 330 miles without failure or deflation of the inner tubes. Using a conventional inner tube and with a nail of the size 0.134 inch driven into the tire and through the inner tube, the tube was completely deflated after driving the vehicle 19 miles. The improved inner tube has demonstrated its resistance to punctures and its capability of supporting a damaged casing with consequent beneficial results to the protection of the tire casing and the inner tube and to the vehicle and to its occupants.

The present method of assembly of the improved tube permits the tube to be manufactured conveniently and economically. By the present method the various portions of the tubes are assembled in proper relationship without folds, wrinkles or other functional distortion.

While reference is made to rubber and rubber compositions, it is to be understood, that the invention contemplates the use of synthetic rubber as well as natural rubber. By synthetic rubber I refer especially to the butadiene-1,3-derived rubbery materials which lie within the class of neoprene (polychloroprene), Buna-S (rubbery copolymer of butadiene-1,3 and styrene), Buna-N (rubbery copolymer of butadiene-1,3 and acrylonitrile), butyl (rubbery copolymer of a major proportion of a monoolefin, e. g., isobutylene, with a minor proportion of a conjugated 1,3-diene, e. g., isoprene). In addition to the foregoing compositions, I may employ other suitable artificial elastic materials or rubber substitutes, particularly in the relatively inextensible portions of the tube, such as plasticized nylon, plasticized polyvinyl chloride, polymerized alkyl acrylates, and similar flexible materials having some degree of resilience or rubbery characteristics.

Having thus described my invention, what I claim and desire to protect by Letters Patent is:

1. The method of making an inner tube comprising the steps of forming an air-retaining liner tube, forming a band of a plurality of rubberized plies of strain-resisting elements, shaping said band in annular toroidal form, subsequently applying the said shaped band over the crown and sidewall portions of the said tube, and integrally uniting said band and tube.

2. The method of making an inner tube comprising the steps of forming an air retaining liner tube, curing the tube, forming a band of a plurality of plies of vulcanizable rubber coated inextensible strain-resisting elements, shaping said band in annular toroidal form, subsequently applying the said shaped band over the crown and sidewall portions of the said tube, and vulcanizing the assembly in a mold to integrally unite the band and tube.

3. The method of making an inner tube comprising the steps of forming an air retaining liner tube, buffing the outer surface of the tube, coating the tube with rubber cement, forming a rim guard strip of extensible material, coating the medial zone of the strip with an adhesion preventing material, applying the strip to the rim area of the liner tube, forming a band of a plurality of plies of vulcanizable rubber coated nylon strain-resisting elements, shaping the band in annular toroidal form, inserting the liner tube in the shaped band, and vulcanizing the assembly in a mold.

4. The method of making an inner tube comprising forming an annular toroidal air-retaining liner tube, curing the tube, applying an extensible strip over the rim area of said tube, the lateral margins of said strip being temporarily attached to the tube and the medial zone of the strip being free of attachment to the tube, forming a band of a plurality of plies of rubberized strain-resisting elements, shaping said band in annular toroidal form, subsequently applying said shaped band over the crown and sidewalls of said tube, the edges of said band overlapping the said margins of said strip, and vulcanizing the assembly in a mold.

5. The method of making an inner tube comprising the steps of forming an air-retaining liner tube in annular toroidal form of a rubber composition, curing the tube in a mold, inflating the tube, buffing the inflated tube, coating the tube with rubber cement, forming a rim guard strip of extensible material, coating the medial zone of the strip with an adhesion preventing material, temporarily attaching the edges of the strip to the rim area of the liner tube, forming a band of a plurality of plies of strain-resisting elements coated with an elastic composition, the strain-resisting elements of said plies extending in a generally diagonal direction, the direction of the strain-resisting elements in one ply being opposite to the direction of the strain-resisting elements in an adjacent ply, shaping the band in annular toroidal form in a vacuum shaping box, inserting the liner tube in the said band, said band covering the crown and sidewalls of the liner tube and the edges of said band being superimposed on the edge of the said strip, and vulcanizing the assembly in a mold to integrally unite the band and liner tube.

6. The method of making an inner tube comprising the steps of forming an air retaining envelope of a rubber composition in annular toroidal form, curing the said envelope, forming an annular band by superimposing a plurality of plies comprising parallel stranded strain resisting material running generally diagonally in said band, skim coated on each side with vulcanizable rubber stock, placing said band in a vacuum shaping box having a toroidal cavity and a central opening for receiving the band, pressing one lateral margin of the band into sealing engagement with one edge of said cavity and fixedly holding said margin in such engagement, pressing the band into sliding sealing engagement with the other edge of said cavity, applying vacuum to the cavity to draw the band into conformity therewith, inserting the air retaining envelope in a deflated condition into the shaped band within the box, inflating the envelope to bring it into engagement with the band, and vulcanizing the assembly under pressure in a mold.

ALFRED N. IKNAYAN.

REFERENCES CITED

The following references are of record in the file of this patent:

UNITED STATES PATENTS

| Number | Name | Date |
| --- | --- | --- |
| 1,818,710 | Hannon | Aug. 11, 1931 |
| 2,231,182 | Eger | Feb. 11, 1941 |
| 2,372,382 | Krusemark | Mar. 17, 1945 |
| 2,498,953 | Glynn | Feb. 28, 1950 |
| 2,514,183 | Chandley | July 4, 1950 |